United States Patent
Gage

(10) Patent No.: US 6,629,687 B1
(45) Date of Patent: Oct. 7, 2003

(54) VAPOR-LIQUID CONTACT TRAY MANWAY

(75) Inventor: Gary W. Gage, Grand Prairie, TX (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 10/304,254

(22) Filed: Nov. 26, 2002

Related U.S. Application Data

(60) Provisional application No. 60/333,898, filed on Nov. 28, 2001.

(51) Int. Cl.[7] .................................................. B01F 3/04
(52) U.S. Cl. ..................................... 261/114.5; 202/270
(58) Field of Search ................ 261/114.5, 114.1–114.4; 203/DIG. 22; 202/158, 270

(56) References Cited

U.S. PATENT DOCUMENTS

| | | | | |
|---|---|---|---|---|
| 2,611,457 A | * | 9/1952 | Glitsch ..................... | 261/114.1 |
| 2,611,596 A | * | 9/1952 | Glitsch ..................... | 261/114.5 |
| 3,674,246 A | * | 7/1972 | Freeman ................... | 261/114.1 |
| 3,759,497 A | * | 9/1973 | Black .......................... | 261/113 |
| 4,120,919 A | | 10/1978 | McClain ................... | 261/114.5 |
| 4,133,852 A | * | 1/1979 | DiNicolantonio et al. ........................ | 261/114.5 |
| 4,294,049 A | * | 10/1981 | Young et al. .................. | 52/20 |
| 6,267,359 B1 | * | 7/2001 | Stippick ................... | 261/114.5 |
| 6,422,539 B1 | * | 7/2002 | Burton et al. ............ | 261/114.4 |

* cited by examiner

*Primary Examiner*—Richard L. Chiesa
(74) *Attorney, Agent, or Firm*—Shook, Hardy & Bacon, L.L.P.

(57) ABSTRACT

A vapor-liquid contact tray is provided with a quick opening manway. The manway includes an opening formed in the tray and an overlying cover formed by a pair of panels joined together by a center hinged connection. The cover panels of the manway have upturned flanges formed along the lateral margins of the cover. The flanges are removably received within inverted U-shaped brackets that are positioned along the lateral margins of the tray adjacent the manway opening. When the cover is closed, the flanges are received tightly within the associated brackets to secure the lateral margins of the cover to the tray. The cover can be opened by lifting one or both cover panels to cause them to fold together about the center hinge. As the cover panels are lifted, the flanges tilt within the brackets and are released from engagement therewith. The end margins of the cover panels are secured to the adjacent portions of the tray by conventional manway clamps.

18 Claims, 4 Drawing Sheets

VAPOR-LIQUID CONTACT TRAY MANWAY

CROSS REFERENCE TO RELATED APPLICATIONS

This application claims the benefit of provisional Application Ser. No. 60/333,898, filed Nov. 28, 2001.

BACKGROUND OF THE INVENTION

The present invention is directed to mass transfer devices and, more particularly, to vapor-liquid contact trays having removable manways.

Vapor-liquid contact trays are used in mass transfer columns to facilitate contact and interaction between ascending vapor streams and descending liquid streams. A plurality of vapor-liquid contact trays are normally installed in vertically spaced apart relationship within a region of the column. Each tray typically extends horizontally across the entire cross section of the column and is supported by rings or other supports welded to an inner face of the column shell. Installation and removal of the trays is extremely time consuming and labor intensive because each tray is normally assembled within the column from numerous component pieces that must be sized small enough to pass through external openings provided in the column shell.

Vapor-liquid contact trays are frequently provided with manways that can be opened to provided a temporary vertical passageway through the trays once they have been installed within the column. These manways are typically formed by a suitably sized opening formed in each tray deck and an overlying cover formed by one or more removable panels. When internal access to the column is needed, the manway covers are removed and a person is able to pass vertically through the trays to perform the necessary inspection or maintenance of the trays or column.

An earlier manway design, that remains in widespread use, utilizes numerous manway clamps to releaseably secure the manway cover to the overlapped edges of the surrounding tray panels. The clamps use an oval shaped flat washer that is positioned on a vertical stud that passes through the overlapped portions of the cover and tray panels and carries two nuts threaded onto opposite ends of the stud. When the nuts are tightened, the oval washer pinches the overlapped portions together and secures the cover to the surrounding tray panels. Cutouts are positioned in edges of the manway cover at the locations of the clamps so that the cover can be removed by loosening the nuts and turning the oval washer so that it is positioned completely within the cutout.

While the manway design described above is simple to use and reliable, removal and installation of the manway cover can be a time consuming process as each clamp is tightened or loosened. Because large numbers of vapor-liquid contact trays are often provided within a column, manways that can be quickly opened and closed are desired. One such design is disclosed in U.S. Pat. No. 4,120,919. The manway disclosed in that patent utilizes a cover formed from two panels that are joined together by a center hinge. The lateral margins of the panels are releaseably secured beneath clips that are welded or otherwise secured to the edges of the adjacent tray panels. The ends of the cover are releaseably secured to the adjacent end panels by a handle arrangement. When removal of the manway cover is desired, the handles are turned to release the cover from the end panels and the center hinge allows the cover panels to be folded upwardly, thereby releasing the lateral margins of the panels from the clips. While the described manway design allows rapid opening and closing of the manway cover, modifications must be made to the adjacent tray panels in order to install the manway cover. In addition, folding of the center hinge during removal of the cover initially causes a slight outward movement of the cover panels and may cause them to become tightly wedged and difficult to remove from beneath the clips.

As a result, a need has developed for a manway that can be quickly and easily opened and closed and which does not require modification of the surrounding tray panels.

SUMMARY OF THE INVENTION

In one aspect, the present invention is directed to a vapor-liquid contact tray having a quick opening manway comprising a cover and an opening positioned in a deck portion of the tray. The tray deck includes a plurality of deck panels that extend in a common plane and frame the opening. The cover is positionable over the opening and comprises at least two cover panels, each having an inner edge portion, an outer edge portion, and opposed end portions. A hinged connection joins the cover panels together along their inner edge portions to permit folding movement of the cover panels between a unfolded position in which the cover panels are generally coplanar and cover the opening and an at least partially folded position in which the cover panels are inclined relative to each other to permit removal of the cover from the opening. At least one and preferably multiple brackets are mounted on top of the deck panels adjacent the manway opening. Each bracket has an arm presenting a downward facing engagement surface spaced a preselected distance above the associated deck panel and an open side facing the cover panels. One or more flanges extending upwardly from the outer edge portion of one and preferably both of said cover panels are positioned for being inserted through the open side of the bracket when the cover panels are moved toward the unfolded position. When the cover panels are in the unfolded position, an upper edge of the flange is brought into frictional engagement against the engagement surface of the bracket arm to thereby secure the outer edge portion of cover panels against upward movement. When opening of the cover is desired, an upward force is applied to the cover panels to raise their inner edge portions and allow the cover panels to fold about the hinged connection and thereby release the frictional engagement of the flanges within the associated brackets. At least one clamp, which may be of conventional design, is used to releaseably secure one or both end portions of one or both cover panels to an adjacent one of the deck panels when the cover panels are in the closed or unfolded position.

BRIEF DESCRIPTION OF THE DRAWINGS

In the accompanying drawings which form part of the specification and are to be read in conjunction therewith and in which like reference numerals are used to indicate like parts in the various view.

DESCRIPTION OF THE PREFERRED EMBODIMENT

Figure 1:
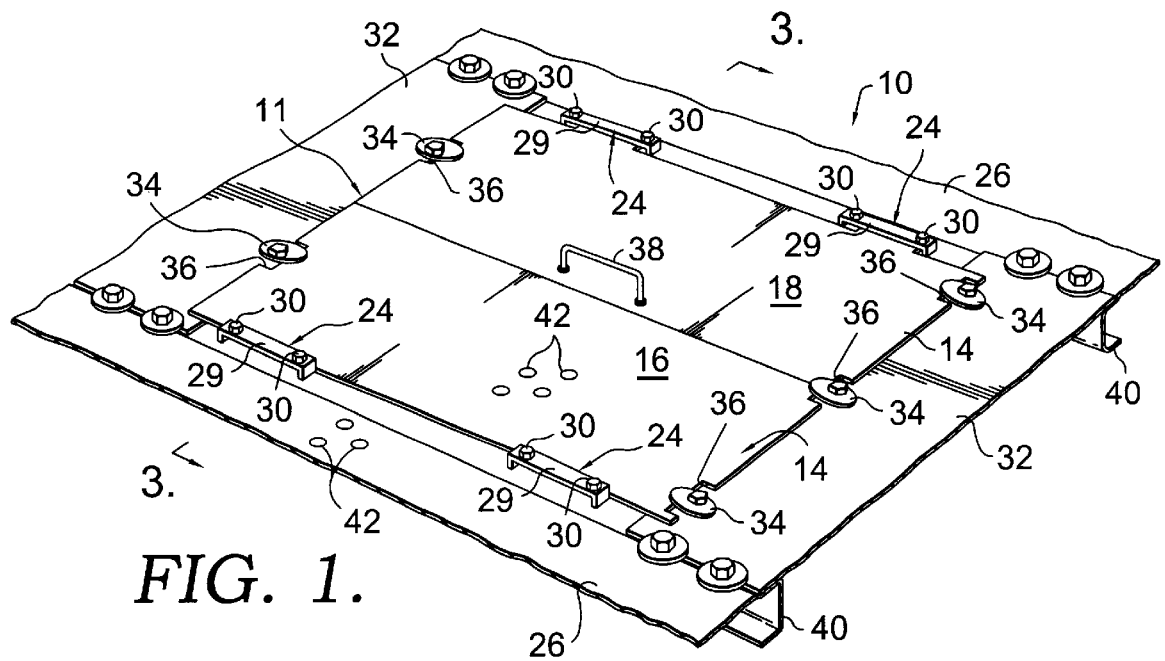
FIG. 1 is a top perspective view of a manway constructed in accordance with the present invention and shown positioned within a fragmentary portion of a vapor-liquid contact tray.
Figure 2:
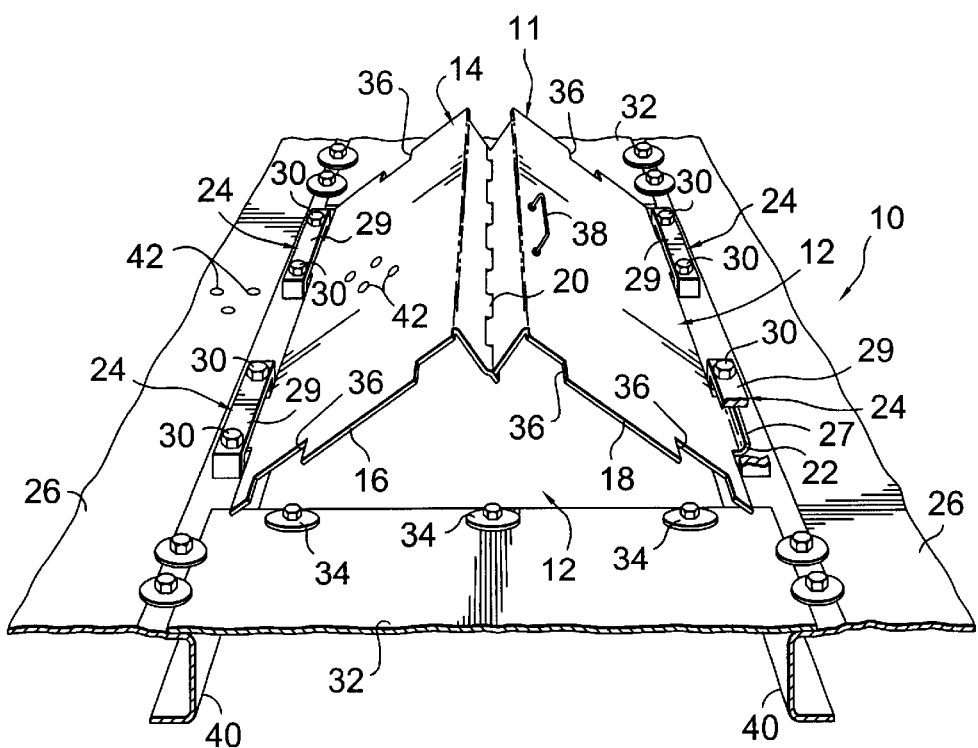
FIG. 2 is a fragmentary top perspective view of the manway shown in FIG. 1 with the cover being partially opened.
Figure 3:
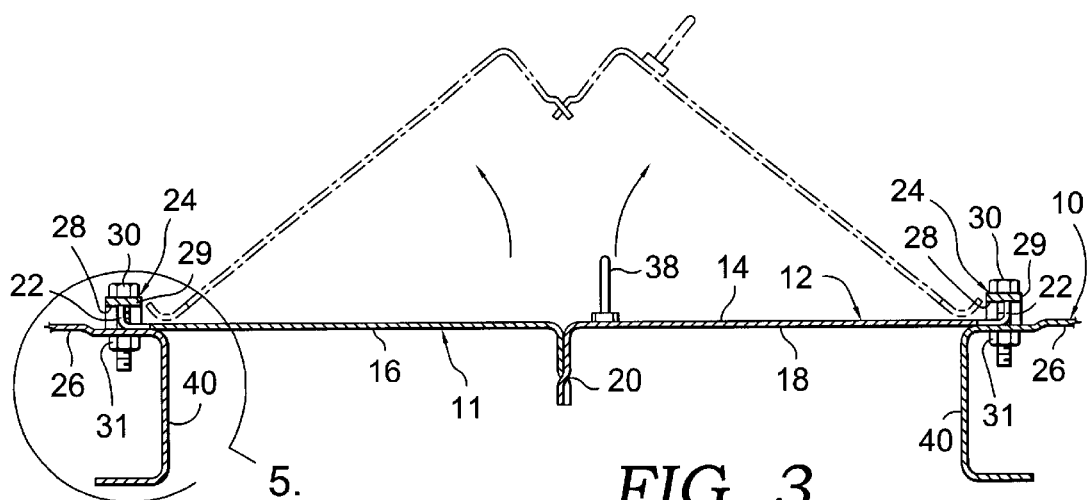
FIG. 3 is an end elevation view of the manway taken in vertical section along line 3—3 of FIG. 1 with phantom lines illustrating the partially opened manway cover.
Figure 4:
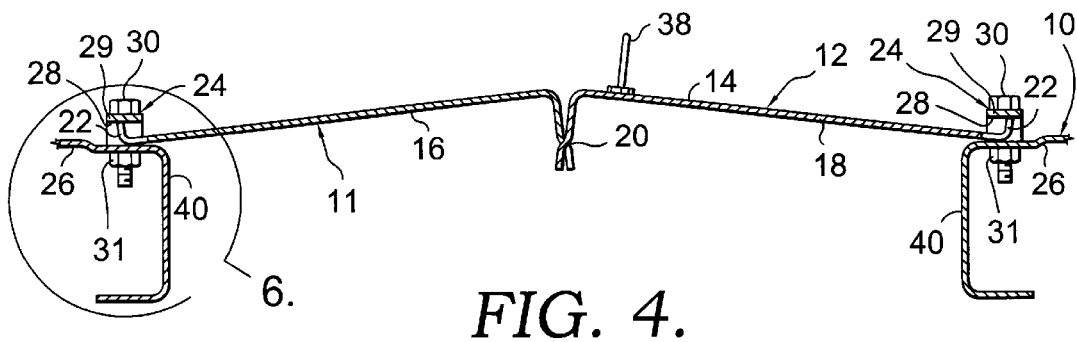
FIG. 4 is an end elevation view of the manway similar to the view shown in FIG. 3 but showing the manway cover in a partially opened position.

Turning now to the drawings in greater detail, and initially to FIGS. 1 and 2, a vapor-liquid contact tray 10 having a planar, horizontally-extending tray deck is provided with a manway 11 comprising an opening 12 and a cover 14. The cover 14 utilizes two panels 16 and 18 foldably secured together along a center hinge 20 that may be constructed in accordance with U.S. Pat. No. 4,120,919, which is incorporated herein by reference. Turning additionally to FIGS. 3 and 4, the lateral edges or margins of at least one and preferably both of the cover panels 16 and 18 include spaced apart and upturned flanges 22 that are received within an open side of inverted U-shaped retainer brackets 24 that are secured to the margins of the tray deck panels 26 adjacent the manway opening 12.

Figure 5:
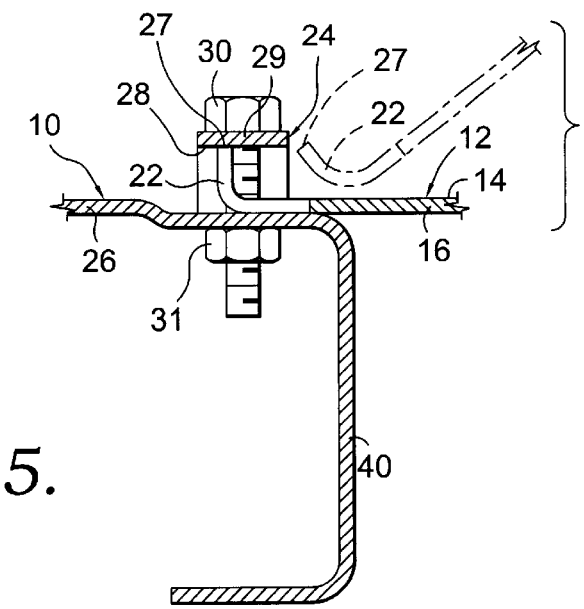
FIG. 5 is an enlarged, fragmentary view of the manway clamping flange and bracket taken within the circle designated by the numeral 5 in FIG. 3.
Figure 6:
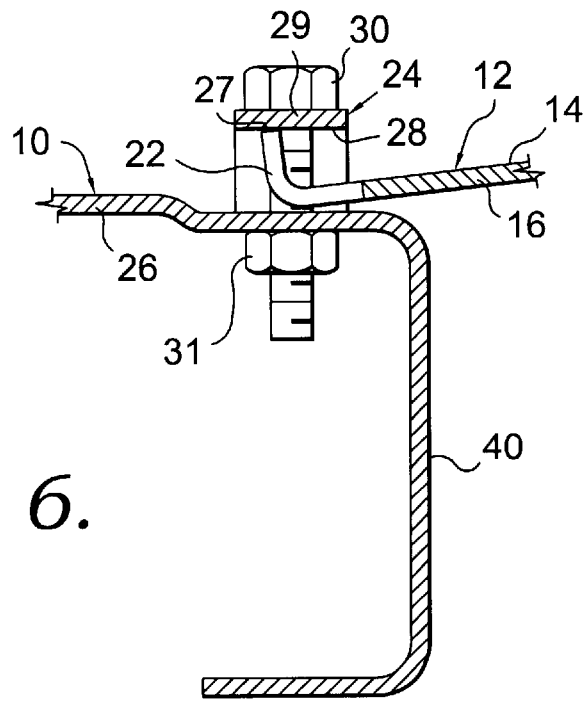
FIG. 6 is an enlarged, fragmentary view of the manway clamping flange and bracket taken within the circle designated by the numeral 6 in FIG. 4 and showing the manway cover moved to a partially opened position.
Figure 7:
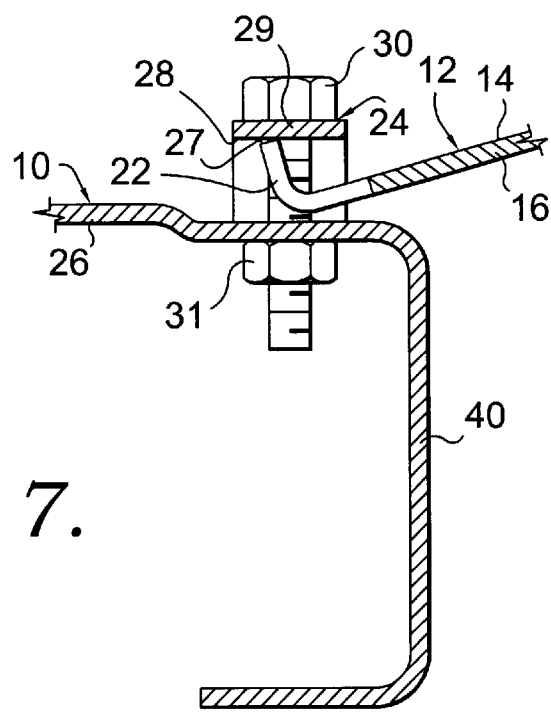
FIG. 7 is an enlarged, fragmentary view of the manway clamping flange and bracket similar to the views shown in FIGS. 5 and 6 but showing the manway cover tilted to a more completely opened position.

As can best be seen in FIG. 5, the flanges 22 and brackets 24 are constructed such that a top, free edge 27 of each flange 22 bears against an undersurface 28 of a horizontally-extending arm 29 of the associated bracket 24 when the panels 16 and 18 are in the unfolded, closed position. As shown sequentially in FIGS. 6–7, when the center hinge 20 is slightly raised to initiate folding and removal of the panels 16 and 18, the free edge 27 of the flange 22 is able to slide outwardly a slight distance along the undersurface 28 of the arm 29 of the bracket 24 without binding. As the flange 22 moves outwardly this slight distance, it tilts outwardly a slight amount from its previous 90 degree orientation in relation to the tray 10 and the undersurface 28 of the arm 29 of the bracket 24. This outward tilting of the flange 22 provides a slight clearance between the flange 22 and the undersurface 28 of the bracket arm 29 as well as the top surface of the associated deck panel 26, further ensuring that the flange 22 does not become tightly wedged under the bracket 24 and allowing it to be easily removed from the bracket 24 as illustrated by the phantom lines in FIGS. 3 and 5.

Each bracket 24 can be secured on top of the associated deck panel 26 using a pair of bolts 30 that extend through the bracket arm 29 and nuts 31 that are tightened against the undersurface of the associated deck panel 26. The bracket arms 29 preferably have a longitudinal length that allows the bolts 30 to be positioned for extending through existing bolt holes that are already formed in the overlapping margins of the adjacent deck panels 26. As a result, modification of the adjacent deck panels 26 is unnecessary and already installed trays can be retrofitted with the manway 11 of the present invention without the costly and time consuming tray modifications required by existing quick opening manway designs.

The ends of the manway cover 14 can be secured to end panels 32 of the tray 10 using conventional manway clamps 34 and cutouts 36 provided in the ends of the cover 14. Notably, because clamps 34 need only be positioned along the ends of the manway cover 14, the number of clamps 34 needed to secure the cover 14 is greatly reduced in comparison to existing manway designs that position clamps along the entire perimeter of the cover. One or more optional handles 38 may also be provided to facilitate lifting of the manway cover 14.

The manway opening 12 is of sufficient size and shape to permit passage of a person and/or tray components. The cover panels 16 and 18, in turn, are sized and shaped to completely cover the manway opening 12 when the panels 16 and 18 are in their coplanar, unfolded closed position. The margins of the cover panels 16 and 18 preferably overlap and are supported on the margins of the adjacent deck panels 26. The margins of the deck panels 26 are preferably offset in a downward direction by an amount equal to the thickness of the cover panels 16 and 18 so that the upper surfaces of the cover panels 16 and 18 and deck panels 26 are in a common plane. A plurality of underlying support beams 40 are used to support the deck panels 26 and may be formed integrally with the deck panels 26 in a known fashion.

As shown in FIGS. 1 and 2, a plurality of vapor passages 42 are preferably placed within the panels 16 and 18 of manway cover 14 to permit vapor to ascend through the cover 14 for interaction with liquid flowing across the deck of the tray. The vapor passages 40 may be of any conventional forms, such as sieve holes and fixed or moveable valves. The deck panels 26 will normally contain the same or similar vapor passages 40 as are provided in the cover panels 16 and 18. Although only a small number of vapor passages 40 are shown in the drawings for illustration purposes, it is to be understood that the vapor passages 40 will normally be uniformly distributed across most if not all of the area of the tray 10.

Figure 8:
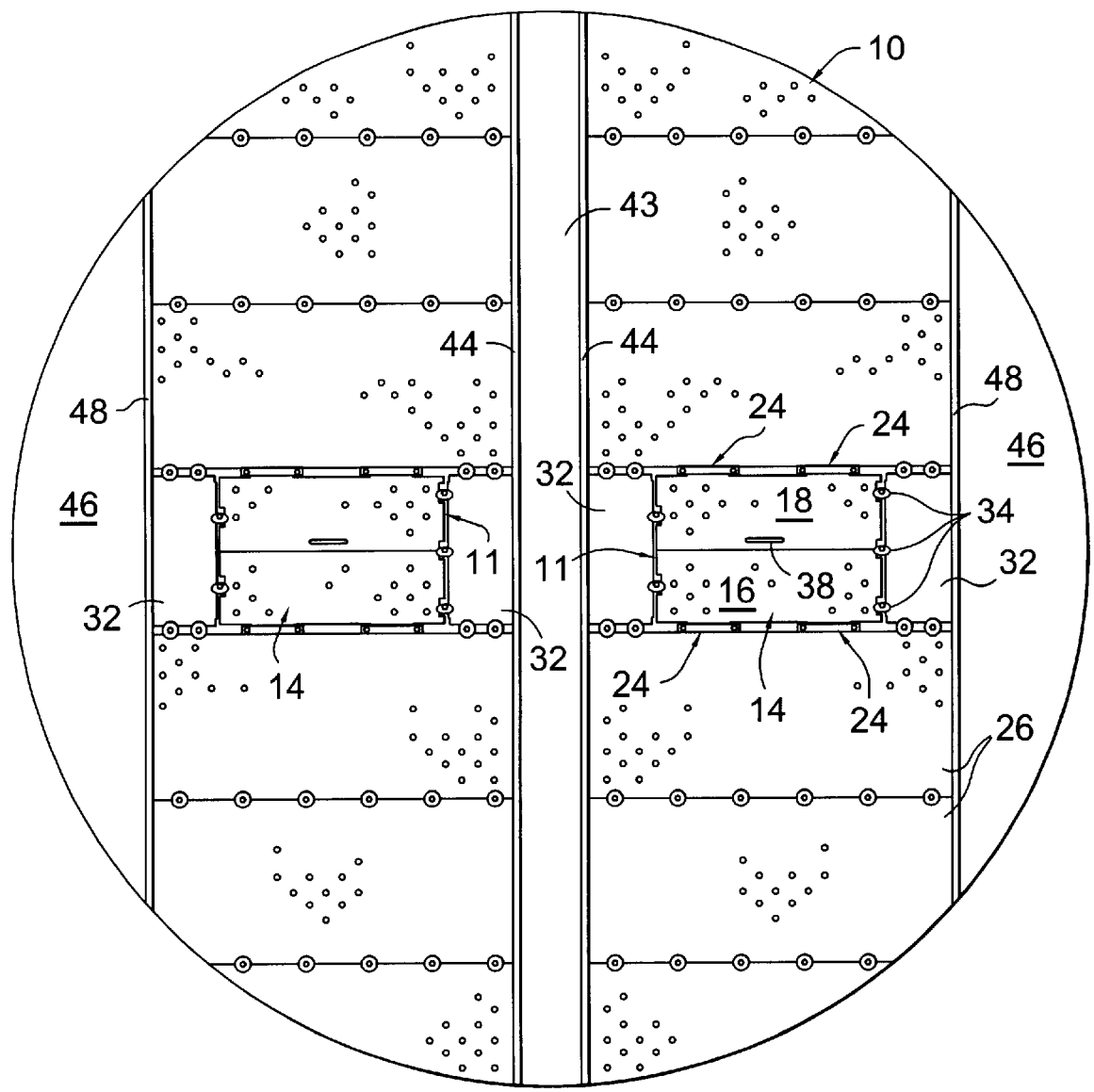
FIG. 8 is a top plan view of the vapor-liquid contact tray containing two manways constructed in accordance with the present invention.

It is to be understood that more than one manway 11 may be provided in some or all of the vapor-liquid contact trays 10 in the column. For example, in the two-pass tray 10 illustrated in FIG. 8, a pair of manways 11 are positioned on opposite sides of a center downcorner 43 to allow a person to pass through the tray 10 on either side of the center downcorner 43. The tray 10 will normally include inlet weirs 44, imperforate liquid receiving areas 46, outlet weirs 48 and other known components which are not described herein because of their conventional nature.

From the foregoing, it will be seen that this invention is one well adapted to attain all the ends and objectives hereinabove set forth together with other advantages which are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A vapor-liquid contact tray for a mass transfer or heat exchange column comprising:

a tray deck comprising a plurality of deck panels extending in a common plane and framing an opening;

a cover positionable over said opening and comprising at least two cover panels each having an inner edge portion, an outer edge portion, and opposed end portions;

a hinged connection joining said cover panels together along said inner edge portions to permit folding movement of said cover panels between a unfolded position in which the cover panels are generally coplanar and an at least partially folded position in which the cover panels are inclined relative to each other;

at least one bracket mounted on top of one of said deck panels adjacent said opening, said bracket having an arm presenting an engagement surface spaced a preselected distance above and facing said one of said deck panels and an open side facing said cover panels;

at least one flange extending upwardly from the outer edge portion of said one of said cover panels and positioned for being inserted through the open side of the bracket when the cover panels are moved to said unfolded position, said flange having an upper edge in frictional engagement against said engagement surface of the bracket arm when the cover panels are in said unfolded position to thereby secure the outer edge portion of said one of said cover panels against upward movement, said frictional engagement being released when said cover panels are moved to said at least partially folded position; and at least one clamp releaseably securing one of said end portions of one of said cover panels to an adjacent one of said deck panels.

2. The vapor-liquid contact tray of claim 1, wherein the outer edge portions of the cover panels at least partially overlap with said deck panels when the cover panels are in said unfolded position.

3. The vapor-liquid contact tray of claim 2, including a plurality of vapor passages in said cover panels.

4. The vapor-liquid contact tray of claim 3, including another of said clamps releaseably securing the other of said end portions of one of said cover panels to an adjacent one of said deck panels.

5. The vapor-liquid contact tray of claim 4, including a handle positioned on top of said one of said cover panels.

6. The vapor-liquid contact tray of claim 5, including a plurality of said vapor passages in said deck panels.

7. The vapor-liquid contact tray of claim 1, including a plurality of vapor passages in said cover panels.

8. The vapor-liquid contact tray of claim 7, including a handle positioned on top of one of said cover panels.

9. The vapor-liquid contact tray of claim 8, including a plurality of said vapor passages in said deck panels.

10. A vapor-liquid contact tray for a mass transfer or heat exchange column comprising:

a tray deck comprising a plurality of deck panels extending in a common plane and framing an opening;

a cover positionable over said opening and comprising at least two cover panels each having an inner edge portion, an outer edge portion, and opposed end portions;

a hinged connection joining said cover panels together along said inner edge portions to permit folding movement of said cover panels between a unfolded position in which the cover panels are generally coplanar and an at least partially folded position in which the cover panels are inclined relative to each other;

first and second brackets mounted on top of said deck panels adjacent said opening and on opposite sides thereof, said first and second brackets each having an arm presenting an engagement surface spaced a preselected distance above and facing said deck panel and an open side facing said cover panels;

a first flange extending upwardly from the outer edge portion of one of said cover panels and a second flange extending upwardly from the outer edge portion of the other of said cover panels, said first and second flanges being positioned for being inserted through the open side of the first and second brackets, respectively, when the cover panels are moved to said unfolded position, said first and second flanges each having an upper edge in frictional engagement against said engagement surface of the arm when the cover panels are in said unfolded position to thereby secure the outer edge portions of said one cover panel and said another cover panel against upward movement, said frictional engagement being released when said cover panels are moved to said at least partially folded position; and at least one clamp releaseably securing the end portion of one of said cover panels to an adjacent one of said deck panels.

11. The vapor-liquid contact tray of claim 10, wherein the outer edge portions of the cover panels at least partially overlap with said deck panels when the cover panels are in said unfolded position.

12. The vapor-liquid contact tray of claim 11, including a plurality of vapor passages in said cover panels.

13. The vapor-liquid contact tray of claim 12, including another of said clamps releaseably securing the other of said end portions of one of said cover panels to an adjacent one of said deck panels.

14. The vapor-liquid contact tray of claim 13, including a handle positioned on top of said one of said cover panels.

15. The vapor-liquid contact tray of claim 14, including a plurality of said vapor passages in said deck panels.

16. The vapor-liquid contact tray of claim 10, including a plurality of vapor passages in said cover panels.

17. The vapor-liquid contact tray of claim 16, including a handle positioned on top of one of said cover panels.

18. The vapor-liquid contact tray of claim 17, including a plurality of said vapor passages in said deck panels.

* * * * *